US009800317B2

United States Patent
Le Meur et al.

(10) Patent No.: US 9,800,317 B2
(45) Date of Patent: Oct. 24, 2017

(54) METHOD FOR THE DETECTION OF AN ELECTROMAGNETIC SIGNAL BY AN ANTENNA ARRAY WITH PATTERN DIVERSITY, AND DEVICE IMPLEMENTING SAID METHOD

(71) Applicant: THALES, Courbevoie (FR)

(72) Inventors: Anne Le Meur, Elancourt (FR); Jean-Yves Delabbaye, Vieille-Eglise en Yvelines (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/912,037

(22) PCT Filed: Aug. 13, 2014

(86) PCT No.: PCT/EP2014/067293
§ 371 (c)(1),
(2) Date: Feb. 12, 2016

(87) PCT Pub. No.: WO2015/024828
PCT Pub. Date: Feb. 26, 2015

(65) Prior Publication Data
US 2016/0191139 A1    Jun. 30, 2016

(30) Foreign Application Priority Data

Aug. 23, 2013   (FR) ...................................... 13 01974

(51) Int. Cl.
*H04B 7/08*       (2006.01)
*H04B 1/16*       (2006.01)

(52) U.S. Cl.
CPC ............. *H04B 7/0894* (2013.01); *H04B 1/16* (2013.01)

(58) Field of Classification Search
CPC ... G01S 3/46; G01S 7/35; G01S 13/00; G01S 13/42; G06F 17/18; H03D 1/00; H04B 1/16; H04B 1/26; H04B 1/38; H04B 7/04; H04B 7/08; H04B 7/0894; H04B 7/216; H04B 17/00; H04L 5/00; H04L 27/00; H04L 27/06; H04L 27/28; H04Q 7/00; H04Q 7/20
USPC ......... 342/27, 145, 146, 175, 189, 373, 375; 370/334, 335; 375/136, 147, 224, 260, 375/340, 343; 455/272, 561, 562.1
See application file for complete search history.

(56) References Cited

U.S. PATENT DOCUMENTS

| | | | | |
|---|---|---|---|---|
| 6,049,705 A | * | 4/2000 | Xue | H04B 7/10 455/277.1 |
| 7,539,273 B2 | * | 5/2009 | Struckman | G01S 3/74 342/373 |
| 2004/0165684 A1 | * | 8/2004 | Ketchum | H04B 7/0421 375/343 |

(Continued)

OTHER PUBLICATIONS

Dominique Noguet et al., "Sensing techniques for Cognitive Radio—State of the art and trends—A White Paper-Apr. 15; P1900. 6_WhitePaper_Sensing_final," IEEE Draft; vol. 1900.6, Jul. 17, 2009, pp. 1-117, XP068028971.

*Primary Examiner* — Shawkat M Ali
(74) *Attorney, Agent, or Firm* — Baker & Hostetler LLP

(57) ABSTRACT

A method for detecting an electromagnetic signal by an antenna array with pattern diversity and a device for implementing this method is provided. The method according to the invention requires no prior knowledge of the type of signal and can be implanted on an antenna array with pattern diversity.

7 Claims, 2 Drawing Sheets

(56) References Cited

U.S. PATENT DOCUMENTS

| | | | |
|---|---|---|---|
| 2005/0113141 A1* | 5/2005 | Felter | H04B 1/709 |
| | | | 455/562.1 |
| 2005/0259621 A1 | 11/2005 | Lee | |
| 2010/0085243 A1* | 4/2010 | De Gramont | G01S 7/352 |
| | | | 342/175 |
| 2010/0195705 A1* | 8/2010 | Jallon | H04L 27/0006 |
| | | | 375/224 |
| 2010/0328157 A1* | 12/2010 | Culkin | H01Q 21/061 |
| | | | 342/372 |
| 2011/0273325 A1* | 11/2011 | Goldman | G01S 3/46 |
| | | | 342/146 |
| 2013/0057433 A1* | 3/2013 | Sadler | H04B 7/0842 |
| | | | 342/373 |

\* cited by examiner

METHOD FOR THE DETECTION OF AN ELECTROMAGNETIC SIGNAL BY AN ANTENNA ARRAY WITH PATTERN DIVERSITY, AND DEVICE IMPLEMENTING SAID METHOD

CROSS-REFERENCE TO RELATED APPLICATIONS

This application is a National Stage of International patent application PCT/EP2014/067293, filed on Aug. 13, 2014, which claims priority to foreign French patent application No. FR 1301974, filed on Aug. 23, 2013, the disclosures of which are incorporated by reference in their entirety.

FIELD OF THE INVENTION

The invention relates to the field of the detection of radiofrequency emissions originating, notably, from radars or from telecommunication systems, and received by an antenna array with pattern diversity.

The invention relates more specifically to a method for detecting an electromagnetic signal by an antenna array with pattern diversity and to a device for implementing this method.

BACKGROUND

The array of sensors considered by the invention is made up of antennas that may not be collocated. The antennas exhibit reception patterns that may or may not be identical and their main axes are not oriented in the same direction in space. This type of antenna array is used notably in the field of goniometry.

One problem to be resolved in the field of the detection of electromagnetic signals lies in the absence of prior knowledge of the type of signal intercepted, in particular its frequency bandwidth, the type of modulation used or, more generally, any parameter associated with the wave form of the signal.

The known detection methods are generally constructed on the prior knowledge of the form of the signal and use a filter that is adapted according to this knowledge.

However, it is not possible to implement filters adapted to all the types of signals expected.

Two main types of receivers have been hitherto envisaged to perform a watch over a very wide band of frequencies: the receivers which permanently cover the band to be watched, which detect only the signals of high power, and the narrow band receivers, which do not make it possible to instantaneously cover the total band but which aim to detect signals of lower power and which allow for finer analyses of the signal.

The present invention falls within the scope of the narrow band receivers.

There is a problem to be resolved in devising a method which adapts to any type of signal, regardless of its bandwidth.

Furthermore, there is a problem specific to the arrays with pattern diversity because, at a given instant, the signal can be considered the same, over all the antenna elements of the array, only to within a complex gain, which cannot be reduced to a phase, dependent on the direction of arrival of the signal.

Furthermore, to create a detection processing procedure, it is important to minimize the transfers of data between the sensors and central member (which can be one of the sensors) in order to limit the complexity of the system. This means that it is preferable to implement most of the processing locally, which limits the use that can be made of the dependency (or correlation) of the measurements picked up at the same instant on two different sensors.

The traditional electromagnetic signal detection methods are notably based on the following preliminary steps.

The reception of signals is done through an antenna array with pattern diversity, or goniometric array, and the demodulation of the signal is performed by the same local oscillator for all the sensors of the array. The signal is then sampled, on each reception channel, in real or complex form, then one or more banks of filters are applied, for example, by weighted discrete Fourier transform. In other words, a number of temporarily overlapped discrete Fourier transforms are applied in order to produce an average adaptation to the band of the signals of interest. At the end of this operation, called time-frequency analysis, the signal is transformed into a time-frequency grid that is broken down into time-frequency cells, each cell containing the result of a discrete Fourier transform for a given time interval and a given frequency interval.

One known detection method consists in comparing the power of the signal, in each time-frequency cell, to a given detection threshold. However, this cell-by-cell decision-making is not optimal when the signal is spread in time and/or in frequency.

In effect, the hypothesis underpinning this method is that the signal is concentrated on a very small number of cells, in other words that the discrete Fourier transform used to perform the spectral analysis is adapted to the band of the signal. This hypothesis cannot be valid for all of the range of the signals to be processed, and no integration effect can compensate this defect. Furthermore, to ensure an average time between correct false alarms, since there are a lot of detectors in parallel, the detection threshold is high, making it necessary to have a strong signal-to-noise ratio.

One way of improving the abovementioned methods consists in performing an integration over sliding time-frequency windows, in order to concentrate the energy of the signals which are spread over a number of cells. This switch from a single-cell detector to a multi-cell detector makes it possible to benefit from an incoherent integration gain when the signal is spread over a number of time-frequency cells. The limitation on this method, however, lies in its single-channel nature and the match between the size of the window and the spread of the signal. If the window is underdimensioned, it does not take account of all the useful signal samples, and, conversely, if it is overdimensioned, it integrates noise samples and lowers the apparent signal-to-noise ratio.

Moreover, the known methods generally use only one antenna to perform the detection and consequently do not make use of all the information collected.

SUMMARY OF THE INVENTION

One objective of the present invention is to resolve the limitations of the known solutions and devise a method for detecting electromagnetic signals which does not require prior knowledge of the type of signal and which can be implanted on an antenna array with pattern diversity.

The subject of the invention is a method for detecting an electromagnetic signal, called signal of interest, likely to be contained in an electromagnetic signal received by an antenna array comprising a plurality of antenna elements indexed by an index p, said method comprising the following steps:

applying to said electromagnetic signal received by each antenna element a plurality of time-frequency transforms in order to obtain a representation of said received electromagnetic signal in the form of a plurality of time-frequency cells each containing the spectrum of said received electromagnetic signal for a given frequency interval and a given time interval, for each time/frequency cell of a given set of cells and for each reception channel of index p, calculating the power of said received electromagnetic signal, applying the following nonlinear function $g_p$ to the result of the preceding power calculation, so as to cancel the time/frequency cells containing substantially only noise:

if the power of said signal is below or equal to a first predetermined threshold $t_{0p}$, the result of the function $g_p$ is zero, said first threshold $t_{0p}$ being dependent on the probability q of presence of the signal of interest, on the power of the thermal noise and on the power of the signal of interest, if the power of said signal is strictly above said first threshold $t_{0p}$, the result of the function $g_p$ is equal to the difference between the power of said signal and said first predetermined threshold $t_{0p}$, multiplied by a weighting coefficient $\beta_p$ dependent on the power of the signal of interest and on the power of the thermal noise integrating the result of the application of the nonlinear function $g_p$ over said set of time-frequency cells, calculating a detection criterion T by integrating the result of the preceding integration step over all of the antenna elements, and by adding to the result of this integration a corrective term dependent on the signal-to-noise ratio and on the probability q of presence of the signal of interest in said received electromagnetic signal, comparing the result of the integration to a second predetermined threshold, called detection threshold $S_{det}$, to detect the presence of the signal of interest.

According to a particular aspect of the invention, said first threshold $t_{0p}$ is determined by searching for the intersection between the x-axis and the asymptote at infinity of the logarithm of the likelihood ratio defined as the quotient of the probability densities in the hypothesis in which the signal of interest is present in a time/frequency cell and in the hypothesis in which the signal of interest is absent in a time/frequency cell.

According to a particular aspect of the invention, the probability q of presence of the signal of interest and the sum of the power of the thermal noise and of the power of the signal of interest on each channel are estimated, using the following substeps:

calculating the first and second order moments of the power of the signal measured for each reception channel, identifying the calculated first and second order moments with their theoretical values to form a system of equations, resolving said system of equations to determine, for each reception channel, an estimate $q_p$ of said probability and an estimate of the inverse of said sum, calculating the average of the estimates $q_p$ of said probability over all of the reception channels.

According to a particular aspect of the invention, the estimate of the inverse of the sum of the power of the thermal noise and of the power of the signal of interest is refined by resolving, a second time, said system of equations in which the unknown probability q is replaced by the average of the estimates $q_p$ of said probability over all of the reception channels.

According to a particular aspect of the invention, said second detection threshold $S_{det}$ is configured to observe a given probability of false alarm.

According to a particular aspect of the invention, said antenna array features pattern diversity.

The subject of the invention is also a device for detecting an electromagnetic signal, called signal of interest, likely to be contained in an electromagnetic signal, said device comprising an antenna array comprising a plurality of antenna elements for the reception of said electromagnetic signal and means configured to implement the method according to the invention.

BRIEF DESCRIPTION OF THE DRAWINGS

Other features and advantages of the present invention will become more apparent on reading the following description in relation to the attached drawings which represent.

DETAILED DESCRIPTION

Figure 1:
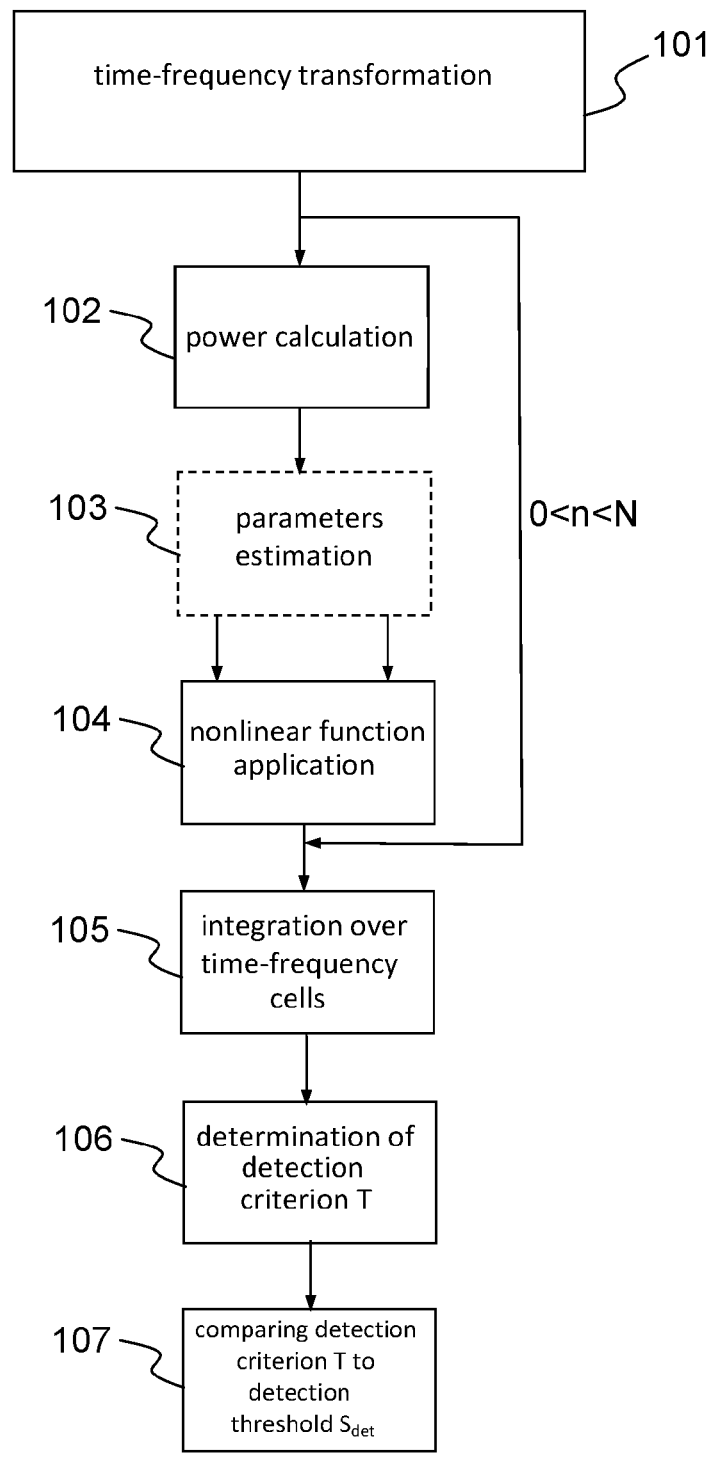
FIG. 1, a flow diagram of the steps for implementing the method for detecting electromagnetic signals according to the invention, FIG. 2, a block diagram of a device for detecting electromagnetic signals for an antenna array with pattern diversity according to the invention.

The signal detection method according to the invention is applied to the signals output from the time-frequency analysis processing performed by discrete Fourier transform.

One objective of the invention is to decide on the presence or absence of a signal s, hereinafter called signal of interest, in the presence of thermal noise modeled as a centered complex random Gaussian signal of constant spectral density for each of its real and imaginary components which are mutually independent.

The principle on which the invention is based consists in using the statistical decision theory which aims to test the validity of one of the two models of the received signal defined respectively by the presence of the signal of interest (hypothesis denoted $H_1$) or the absence of the signal of interest (hypothesis $H_0$), so as to optimize the Neyman-Pearson criterion which consists in maximizing the probability of detection, subject to the constraint that the probability of false alarm is fixed.

The abovementioned hypotheses $H_1$ and $H_0$ are tested for a sliding time-frequency window made up of a plurality of cells. Hereinbelow, the index n will be used as reference for a given time-frequency cell within said window and it is considered that, after spectral analysis by discrete Fourier transform, the signal measured in a time/frequency cell is independent from one sensor to another.

The modeling according to the invention consists in considering that, when the signal of interest $s_{pn}$ is present in the time-frequency cell of index n of the sensor of index p, it is modeled by a sample of a centered complex random Gaussian variable with independent components of variance $\sigma_p'^2$. Moreover, the different values of the sample $s_{pn}$ will be considered as independent in n and in p. This model makes no assumption of phase or amplitude continuity so as to be valid for all the possible modulations, and reflects the phase incoherence from one sensor to another.

Thus, the signal measured for the time-frequency cell of index n of the current window and for the sensor of index p can be written, when the signal of interest is present in the cell considered: $x_{pn}=s_{pn}+w_{pn}$, n=1, 2, . . . , N and p=1, 2, . . . , P($H_1$)

The sample $s_{pn}$ is of non-zero power with a probability q, assumed identical for all the sensors of the array, and of substantially zero power with a probability 1–q.

When the signal of interest is present in a cell, the samples $s_{pn}$ are modeled as independent samples in p and n of centered complex Gaussian variables, such that: $E(|s_{pn}|^2)=2\sigma_p'^2$, in which E( ) denotes the mathematical expectation.

This model takes into account both the lack of knowledge of the modulation of the signal of interest and the lack of knowledge of the array antenna gains.

The samples of the thermal noise $w_{pn}$ are independent samples in p and n of a complex centered Gaussian variable of variance $2\sigma^2$. It is considered hereinbelow that the power of the thermal noise $\sigma^2$ is known.

When the signal is absent from a time-frequency cell, the model according to the invention becomes: $x_{pn}=w_{pn}$, n=1, 2, . . . , N and p=1, 2, . . . , P(hypothesis $H_0$).

Consequently, it is posited that: $2\sigma_p^2=2\sigma_p'^2+2\sigma^2$, the power of the signal measured by a sensor of index p, equal to the sum of the power of the signal of interest and of the power of the thermal noise.

In the hypothesis $H_1$, the probability density of the measurements $x_{pn}$ is written using the following relationship $$p_1 = \prod_{p=1}^{P}\prod_{n=1}^{N} p_1(x_{pn}) = \qquad (1)$$

$$\prod_{p=1}^{P}\prod_{n=1}^{N}\left[\frac{q}{2\pi\sigma_p^2}\exp\left(-\frac{|x_{pn}|^2}{2\sigma_p^2}\right)+\frac{1-q}{2\pi\sigma^2}\exp\left(-\frac{|x_{pn}|^2}{2\sigma^2}\right)\right]$$

In the hypothesis $H_0$, the probability density of the measurements $p_0$ is written also using the relationship (1) by taking q equal to 0.

To produce an optimal detector from the relationship (1), one difficulty lies in the fact that the power $\sigma_p^2$ and probability q parameters are unknown.

For simplicity, the following notations are posited: $t_{pn}=|x_{pn}|^2$, $\tau_p=\frac{1}{2}\sigma_p^2$, p=1, 2, . . . P; and $\tau=\frac{1}{2}\sigma^2$.

Therefore, $\tau > \tau_p$ for p=1, 2, . . . P.

When the parameters $\tau_p$ and q are known, the optimal test within the meaning of the Neyman-Pearson criterion for deciding between the hypotheses $H_1$ and $H_0$ consists in comparing the likelihood ratio $p_1/p_0$ to a predetermined detection threshold.

This ratio can be written, with the new notations:

$$\frac{p_1}{p_0} = \prod_{p=1}^{P}\prod_{n=1}^{N}\left[q\frac{\tau_p}{\tau}\exp((\tau-\tau_p)t_{pn})+1-q\right] \qquad (2)$$

The relationship (2) can also be written in logarithmic form in the form given by the relationship (3):

$$\begin{cases}\ln\frac{p_1}{p_0} = \sum_{p=1}^{P}\sum_{n}\left[\ln\left(q\frac{\tau_p}{\tau}+1-q\right)+\ln\left(\frac{q\frac{\tau_p}{\tau}\exp(\tau-\tau_p)t_{pn}+1-q}{q\frac{\tau_p}{\tau}+1-q}\right)\right] \\ = N\sum_{p=1}^{P}\ln\left(q\frac{\tau_p}{\tau}+1-q\right)+\sum_{p,n}\ln\left(\frac{q\alpha_p\exp(\beta_p t_{pn})+1-q}{q\alpha_p+1-q}\right)\end{cases} \qquad (3)$$

in which the following has been posited: $\alpha_p=\tau_p/\tau$; $\beta_p=\tau-\tau_p$ For generic $\alpha_p$ and $\beta_p$ denoted $\alpha$ and $\beta$, the function $$\varphi: x \to \ln\left[\frac{q\alpha\exp(\beta x)+1-q}{q\alpha+1-q}\right]$$

has the following behavior on $\mathfrak{R}^+$:

$$\varphi(0) = 0$$

$$\varphi(x) \approx \beta x + \ln\frac{q\alpha}{q\alpha+1-q} \text{ for } x \to \infty.$$

This asymptote cuts the x-axis at $$x_0 = -\frac{1}{\beta}\ln\frac{q\alpha}{q\alpha+1-q}(x_0 > 0).$$

By approximating the behavior of the function $\phi(x)$ by its asymptote at +∞ and by the straight line y=0, the function $g_p(x)$ is obtained, defined as follows $$g_P(x) = \begin{cases} 0 & \text{if } 0 \le x \le x_0 \\ \beta(x-x_0) & \text{if } x > x_0 \end{cases}.$$

The detection test according to the invention consists in comparing the logarithm of the likelihood ratio $p_1/p_0$ to a predetermined detection threshold.

By using the approximation by the function $g_p(x)$ defined above in the relationship (3), the detection test according to the invention consists in comparing the function T to a predetermined detection threshold, with T given by the following relationship.

$$T = N\sum_{p=1}^{P}\ln(q\alpha_p+1-q)+\sum_{p=1}^{P}\sum_{n=1}^{N}g_p(t_{pn}) \qquad (4)$$

According to a particular embodiment of the invention, in the case where the parameters $\tau_p$ and q are unknown, they are replaced by an estimation. There now follows a description of a possible method for estimating these two parameters from measurements available in the P analysis windows corresponding to the P reception channels.

The parameters $\tau_p$ and q can be estimated by making use only of the first two moments of the variable $t_{pn}$ and equating the empirical formulation of each of the two moments to the real expression of the moment.

By applying this method, the system of equations given by the relationships (5) is obtained.

$$\begin{cases} m_{1p} = \frac{1}{N}\sum_{n=1}^{N} t_{pn} = \frac{q}{\tau_p} + \frac{1-q}{\tau} = q\left(\frac{1}{\tau_p} - \frac{1}{\tau}\right) + \frac{1}{\tau} \\ m_{2p} = \frac{1}{N}\sum_{n=1}^{N} t_{pn}^2 = \frac{2q}{\tau_p^2} + 2\cdot\frac{1-q}{\tau^2} = 2q\left(\frac{1}{\tau_p^2} - \frac{1}{\tau^2}\right) + \frac{2}{\tau^2} \end{cases} \quad (5)$$

The system of equations (5) comprises 2P equations for P+1 unknowns, with P being the number of antenna elements in the array. One possible method for resolving this system consists in executing the following steps.

The system (5) is resolved for each antenna element of index p to deduce therefrom an estimate of the probability $\hat{q}_p$ of presence of the signal of interest in a time-frequency cell and a first estimate $\hat{\tau}_p$ of the parameter $\tau_p$.

The average of the estimates $\hat{q}_p$ is calculated over all of the antenna elements in order to deduce therefrom the final estimate $\hat{q}$ of the parameter q.

Optionally, the estimate of the parameter $\tau_p$ can be refined by re-introducing the final estimate $\hat{q}$ into the system (5). A second estimate $\hat{\tau}_p$ is thus obtained.

FIG. 1 summarizes, in a flow diagram, the different steps for implementing the method for detecting electromagnetic signals according to the invention.

In a first step 101, a time-frequency transformation is applied to the signals received on each antenna element of the array. More specifically, a number of discrete Fourier transforms, temporarily overlapped, are applied for each signal in order to obtain a time-frequency representation of the signal in the form of a grid of time-frequency cells each containing the spectrum of the signal for a given frequency interval and a given time interval.

In a second step 102, the power of the signal is calculated in each time-frequency cell obtained at the end of the first step 101. At the end of the second step 102, there is, for each antenna element of index p and each time-frequency cell of index n, a measurement of the power $t_{pn}$ of the signal.

In a subsequent step 104, the nonlinear function $g_p$ is applied to each power measurement $t_{pn}$ calculated in the second step 102 in order to eliminate the time-frequency cells assumed to contain only noise.

The nonlinear function $g_p$ is defined using the following relationships:

$$g_p(t_{pn}) = \begin{cases} 0 & \text{if } 0 \le t_{pn} \le t_{0p} \\ \beta_p(t_{pn} - t_{0p}) & \text{if } t_{pn} > t_{0p} \end{cases}$$

with $$t_{0p} = -\frac{1}{\beta_p}\ln\frac{q\alpha_p}{q\alpha_p + 1 - q},$$

$$\alpha_p = \hat{\tau}_p/\tau,$$

$$\beta_p = \tau - \hat{\tau}_p.$$

As introduced above in the description, $\tau=1/2\sigma^2$ and $\hat{\tau}_p=1/2\sigma_p^2$ with $\sigma^2$ being the assumed known value of the power of the thermal noise and $\sigma_p^2$ being an estimation of the sum of the power of the signal of interest and of the power of the thermal noise for the signal received by the antenna element of index p. The parameter q is indicative of the probability of presence of the signal of interest in a time-frequency cell.

The parameters q and $\hat{\tau}_p$ are entry points for the step 104. They can be estimated from the calculation of the 1st and 2nd order moments of the power of the signal on each channel, as explained above, or by any other equivalent method.

In an optional step 103, the parameters q and $\tau_p$ are therefore estimated by means of the following substeps.

In a first substep, the 1st and 2nd order moments of the power of the signal on each reception channel are calculated, in other words the average and the variance over the analysis window.

In a second substep, the system of equations (5) is resolved to deduce therefrom an estimate of the parameter q for each antenna element or sensor and a first estimate of the parameter $\tau_p$.

In a third substep, the average of the estimates of the parameter q over all of the sensors is calculated.

Optionally, the first estimate of the parameter $\tau_p$ is refined by once again resolving the system of equations (5) in which the unknown q has been replaced by its estimate calculated in the third substep.

In a subsequent step 105, the result of the step 104 of nonlinearity is integrated over all of the time-frequency cells of the analysis window.

In a subsequent step 106, the detection criterion T is constructed by integrating the result of the preceding step 105 over all of the sensors, then by adding a corrective term to this result. The detection criterion T can be formulated using the relationship (4):

$$T = N\sum_{p=1}^{P} \ln(q\alpha_p + 1 - q) + \sum_{p=1}^{P}\sum_{n=1}^{N} g_p(t_{pn}) \quad (4)$$

The corrective term added to the incoherent integration of the terms $g_p(t_{pn})$ makes it possible to penalize the reception channels containing relatively less useful information than the others.

Finally, in a last step 107, the detection criterion T is compared to a predetermined detection threshold $S_{det}$ to deduce therefrom the presence or the absence of signal.

The detection threshold $S_{det}$ is determined by simulation to observe a given probability of false alarm.

Figure 2:
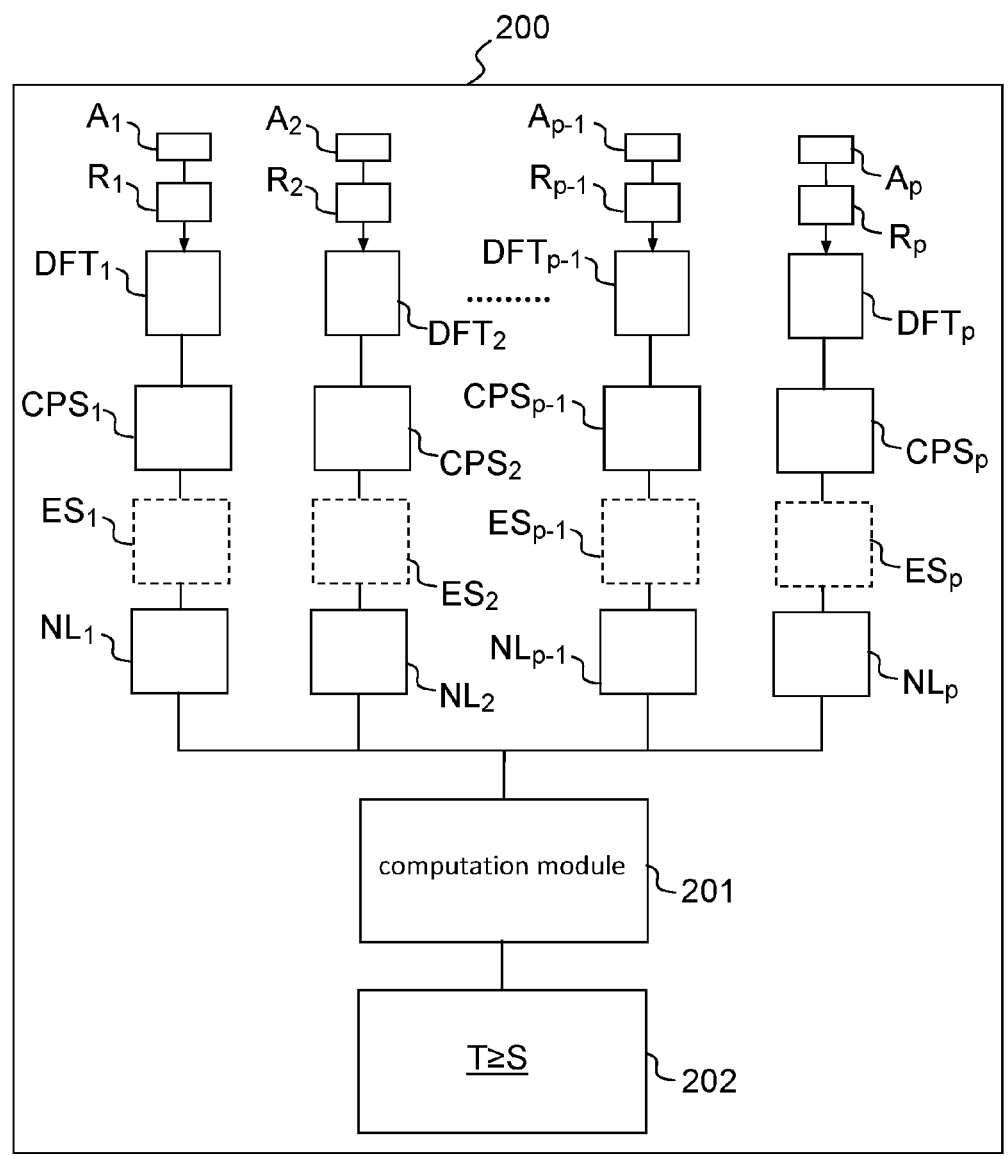

FIG. 2 describes a block diagram of a device 200 for detecting electromagnetic signals for an antenna array with pattern diversity according to the invention.

Such a device 200 comprises an antenna array made up of a plurality of antenna elements or sensors $A_1, A_2, A_3 \ldots A_P$. Each antenna element is coupled to a reception channel $R_1, R_2, R_3 \ldots R_P$ to, in particular, demodulate and sample the analog signal received by each sensor. At the output of each reception channel, a time-frequency transform $DFT_1, DFT_2, DFT_3, DFT_P$ is applied, through one or more temporarily overlapped discrete Fourier transforms. For each reception channel, this operation culminates in the construction of a grid of time-frequency cells each containing the spectrum of the signal for a given time interval and a given frequency interval.

For each reception channel, the device 200 according to the invention further comprises a module for calculating the power of the signal for each time-frequency cell $CPS_1, CPS_2, \ldots CPS_{P-1}, CPS_P$, and a processing module $NL_1$, $NL_2$, $NL_{P-1}$, $NL_P$ for applying the step of nonlinearity 104 of the method according to the invention.

Optionally, the device 200 also comprises, for each reception channel, an estimation module $ES_1$, $ES_2$, $ES_{P-1}$, $ES_P$ for estimating the parameters q and $\tau_p$ according to the step 103 of the method according to the invention.

The device 200 finally comprises a computation module 201 for constructing the detection criterion T according to the steps 105 and 106 of the method according to the invention and a decision module 202 for performing the comparison, according to the step 107, of the criterion T with a predetermined detection threshold.

The computation modules of the device 200 according to the invention can be organized according to different architectures, in particular each step of the method can be implemented by a distinct module or, on the contrary, all of the steps can be combined within a single computation module.

Each of the computation modules that the device according to the invention comprises can be produced in software and/or hardware form. Each module can notably consist of a processor and a memory. The processor can be a generic processor, a specific processor, an application-specific integrated circuit (better known by the acronym ASIC) or a field-programmable gate array (better known by the acronym FPGA).

The invention claimed is:

1. A method for detecting an electromagnetic signal of interest contained in a received electromagnetic signal received by an antenna array comprising a plurality of antenna elements indexed by an index p, said method comprising the following steps:

applying to said received electromagnetic signal received by each antenna element of the plurality of antenna elements a plurality of time-frequency transforms in order to obtain a representation of said received electromagnetic signal in a form of a plurality of time-frequency cells each containing a spectrum of said received electromagnetic signal for a given frequency interval and a given time interval, for each time-frequency cell of a given set of cells and for each reception channel of index p, calculating a power of said received electromagnetic signal, applying a following nonlinear function $g_P$ to a result of a preceding power calculation, so as to cancel the time-frequency cells containing substantially only noise:

if the power of said received electromagnetic signal is below or equal to a first predetermined threshold $t_{0p}$, the result of the function $g_P$ is zero, said first threshold $t_{0p}$ being dependent on a probability q of presence of the electromagnetic signal of interest, on a power of a thermal noise and on a power of the electromagnetic signal of interest, if the power of said received electromagnetic signal is strictly above said first threshold $t_{0p}$, the result of the function $g_P$ is equal to a difference between the power of said received electromagnetic signal and said first predetermined threshold $t_{0p}$, multiplied by a weighting coefficient $\beta_P$ dependent on the power of the electromagnetic signal of interest and on the power of the thermal noise, integrating the result of the nonlinear function $g_P$ over said set of time-frequency cells, calculating a detection criterion T by integrating a result of a preceding integration step over the antenna elements, and by adding to the result of this integration a corrective term dependent on a signal-to-noise ratio and on the probability q of a presence of the electromagnetic signal of interest in said received electromagnetic signal, comparing the result of the integration to a second predetermined threshold, being a detection threshold $S_{det}$, to detect the presence of the electromagnetic signal of interest.

2. The method of claim 1, wherein said first threshold $t_{0p}$ is determined by searching for a intersection between a x-axis and an asymptote at infinity of a logarithm of a likelihood ratio defined as a quotient of probability densities in a hypothesis in which the electromagnetic signal of interest is present in a time-frequency cell and in the hypothesis in which the electromagnetic signal of interest is absent in a time-frequency cell.

3. The method of claim 2, wherein the probability q of presence of the signal of interest and a sum of the power of the thermal noise and of the power of the signal of electromagnetic interest on each channel are estimated, using the following substeps:

calculating first and second order moments of a power of the signal measured for each reception channel, identifying the calculated first and second order moments with their theoretical values to form a system of equations, resolving said system of equations to determine, for each reception channel, an estimate $q_P$ of said probability and an estimate of an inverse of said sum, calculating an average of estimates $q_P$ of said probability over all of the reception channels.

4. The method of claim 3, wherein the estimate of the inverse of the sum of the power of the thermal noise and of the power of the electromagnetic signal of interest is refined by resolving, a second time, said system of equations in which an unknown probability q is replaced by the average of the estimates $q_p$ of said probability over all of the reception channels.

5. The method of claim 1, wherein said second detection threshold $S_{det}$ is configured to observe a given probability of false alarm.

6. The method for of claim 1, wherein said antenna array features pattern diversity.

7. A device for detecting an electromagnetic signal of interest contained in a received electromagnetic signal, said device comprising an antenna array comprising a plurality of antenna elements for reception of said received electromagnetic signal and means configured to implement the method of claim 1.

* * * * *